(12) United States Patent
Dudley et al.

(10) Patent No.: US 9,774,064 B2
(45) Date of Patent: Sep. 26, 2017

(54) BATTERY PACK

(71) Applicant: LG Chem, Ltd., Seoul (KR)

(72) Inventors: Scott Dudley, Commerce Township, MI (US); Robert Merriman, Shelby Township, MI (US)

(73) Assignee: LG Chem, Ltd., Seoul (KR)

( * ) Notice: Subject to any disclaimer, the term of this patent is extended or adjusted under 35 U.S.C. 154(b) by 73 days.

(21) Appl. No.: 14/954,459

(22) Filed: Nov. 30, 2015

(65) Prior Publication Data
US 2017/0155176 A1   Jun. 1, 2017

(51) Int. Cl.
*H01M 10/6551* (2014.01)
*H01M 10/613* (2014.01)
*H01M 10/6556* (2014.01)
*H01M 10/0525* (2010.01)

(52) U.S. Cl.
CPC ...  *H01M 10/6551* (2015.04); *H01M 10/0525* (2013.01); *H01M 10/613* (2015.04); *H01M 10/6556* (2015.04)

(58) Field of Classification Search
CPC .......... H01M 10/6551; H01M 10/613; H01M 10/6556; H01M 10/0525
See application file for complete search history.

(56) References Cited

U.S. PATENT DOCUMENTS

| 7,896,063 B2 | 3/2011 | Shimoyama |
| 8,808,898 B2 | 8/2014 | Alizon et al. |
| 2008/0090137 A1* | 4/2008 | Buck ................... H01M 2/1077 429/120 |

* cited by examiner

*Primary Examiner* — Jane Rhee
(74) *Attorney, Agent, or Firm* — Buckert Patent & Trademark Law Firm PC; John F. Buckert

(57) ABSTRACT

A battery pack having a first battery cell, a first cooling fin, and a housing is provided. The first cooling fin has a rectangular-shaped sheet, and at least first, second, and third tabs disposed perpendicular to first and second major surfaces of the first battery cell. A first side of the rectangular-shaped sheet of the first cooling fin contacts the first major surface of the first battery cell. The first battery cell and the first cooling fin are disposed within an interior region of the housing. The housing has a first flow path within the interior region between a top edge of the first battery cell and a top wall of the housing, such that air flowing through the first flow path contacts the first, second, and third tabs of the first cooling fin to conduct heat energy away from the first cooling fin to reduce a temperature level of the first battery cell.

12 Claims, 8 Drawing Sheets

BATTERY PACK

BACKGROUND

The inventors herein have recognized a need for a battery pack having a cooling fin with at least first, second, and third tabs disposed in a first flow path and being disposed substantially perpendicular to first and second major surfaces of a battery cell for conducting heat energy from the battery cell to air flowing through the first flow path.

SUMMARY

A battery pack in accordance with an exemplary embodiment is provided. The battery pack includes a first battery cell having a substantially rectangular-shaped body with a first major surface and a second major surface. The battery pack further includes a first cooling fin having a substantially rectangular-shaped sheet and at least first, second, and third tabs. The substantially rectangular-shaped sheet of the first cooling fin has a first side and a second side. The first, second, and third tabs of the first cooling fin are coupled to a top end of the substantially rectangular-shaped sheet of the first cooling fin and extend in a first direction from the substantially rectangular-shaped sheet of the first cooling fin. The first, second, and third tabs of the first cooling fin are disposed substantially perpendicular to the substantially rectangular-shaped sheet of the first cooling fin and substantially perpendicular to the first and second major surfaces of the first battery cell. The first side of the substantially rectangular-shaped sheet of the first cooling fin is disposed directly against and contacts the first major surface of the substantially rectangular-shaped body of the first battery cell. The battery pack further includes a housing defining an interior region therein. The first battery cell and the first cooling fin are disposed within the interior region. The housing has a first flow path within the interior region between a top edge of the first battery cell and a top wall of the housing, such that air flowing through the first flow path contacts the first, second, and third tabs of the first cooling fin to conduct heat energy away from the first cooling fin to reduce a temperature level of the first battery cell.

DETAILED DESCRIPTION

Figure 1:
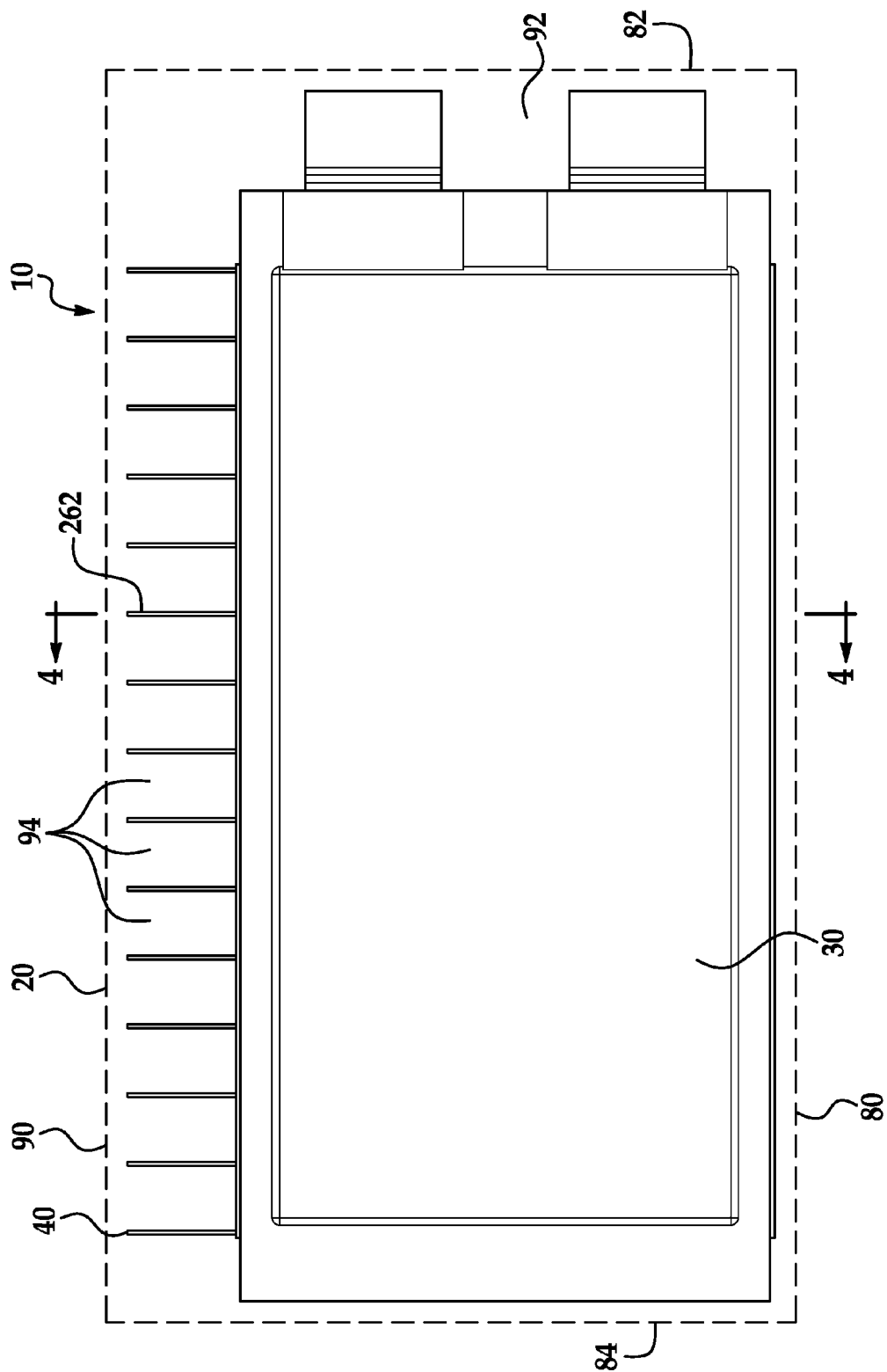
FIG. 1 is a schematic of a battery pack in accordance with an exemplary embodiment.

Referring to FIGS. 1-4, a battery pack 10 in accordance with an exemplary embodiment is provided. The battery pack 10 includes a housing 20, battery cells 30, 32, 34, cooling fins 40, 42, and an electric fan 50. An advantage of the battery pack 10 is that the battery pack 10 utilizes at least first, second, and third tabs disposed in a first flow path 94 and being disposed substantially perpendicular to first and second major surfaces of each of the battery cells 30, 32, 34 for conducting heat energy from the battery cells 30, 32, 34 to air flowing through the first flow path 94. Further, the first and second major surfaces of each of the battery cells 30, 32, 34 are disposed substantially perpendicular to the first flow path 94.

Figure 4:
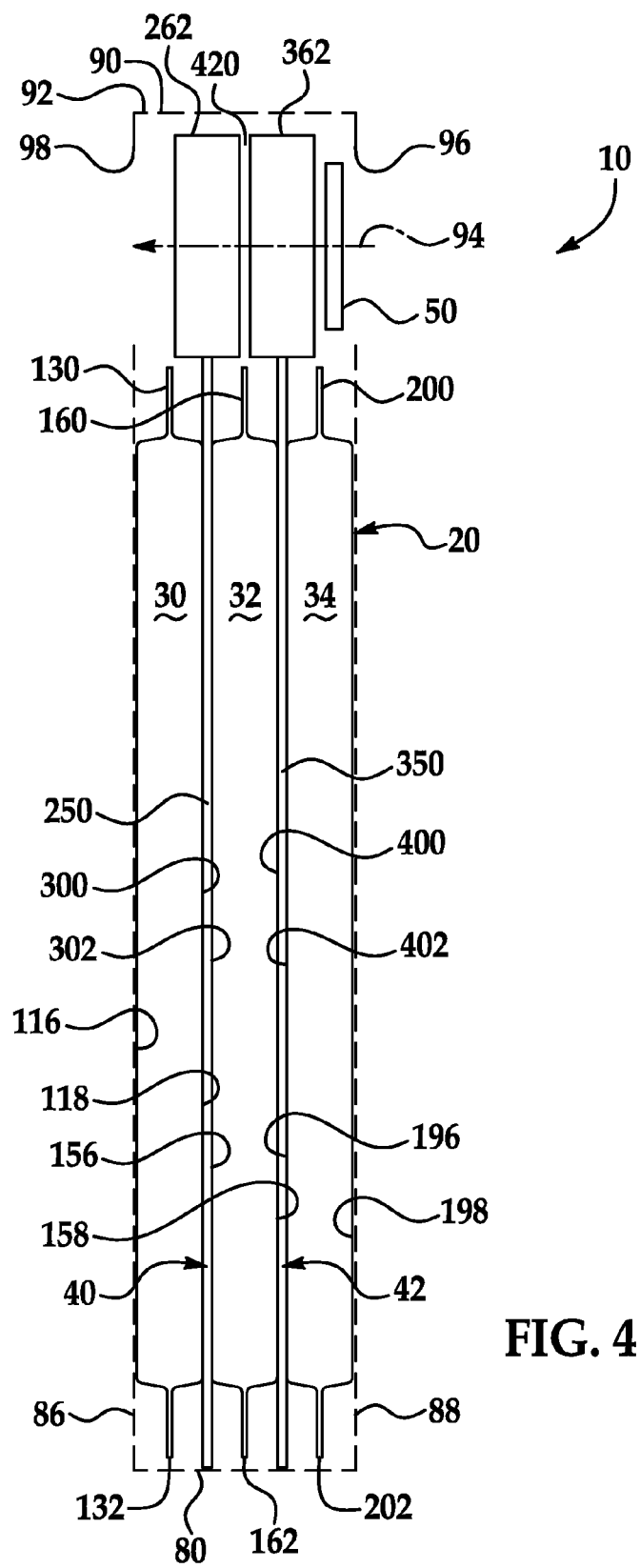
FIG. 4 is a cross-sectional schematic of the battery pack of FIG. 1 taken along lines 4-4 in FIG. 1.

Referring to FIGS. 1 and 4, the housing 20 is provided to hold the battery cells 30, 32, 34, the cooling fins 40, 42, and the electric fan 50 within an interior region 92 defined by the housing 20. The housing 20 includes a bottom wall 80, side walls 82, 84, 86, 88, and a top wall 90. The side walls 82, 84 are disposed substantially parallel to one another, and are coupled to and disposed perpendicular to the side walls 86, 88. The bottom wall 80 is coupled to a bottom end of each of the side walls 82, 84, 86, 88. The top wall 90 is coupled to a top end of each of the side walls 82, 84, 86, 88. The side wall 88 has an aperture 96 extending therethrough. Further, the side wall 86 has an aperture 98 extending therethrough. The housing 20 has a first flow path 94 within the interior region 92 between top edges of the battery cells 30, 32, 34 and the top wall 90 of the housing 20. The first flow path 94 is further at least partially defined by spaces between each pair of tabs of the cooling fin 40, and spaces between each pair of tabs of the cooling fin 42. Further, air flowing through the first flow path 94 contacts the tabs of the cooling fins 40, 42 to conduct heat energy away from the cooling fins 40, 42 to reduce a temperature level of the battery cells 30, 32, and 34.

Figure 3:
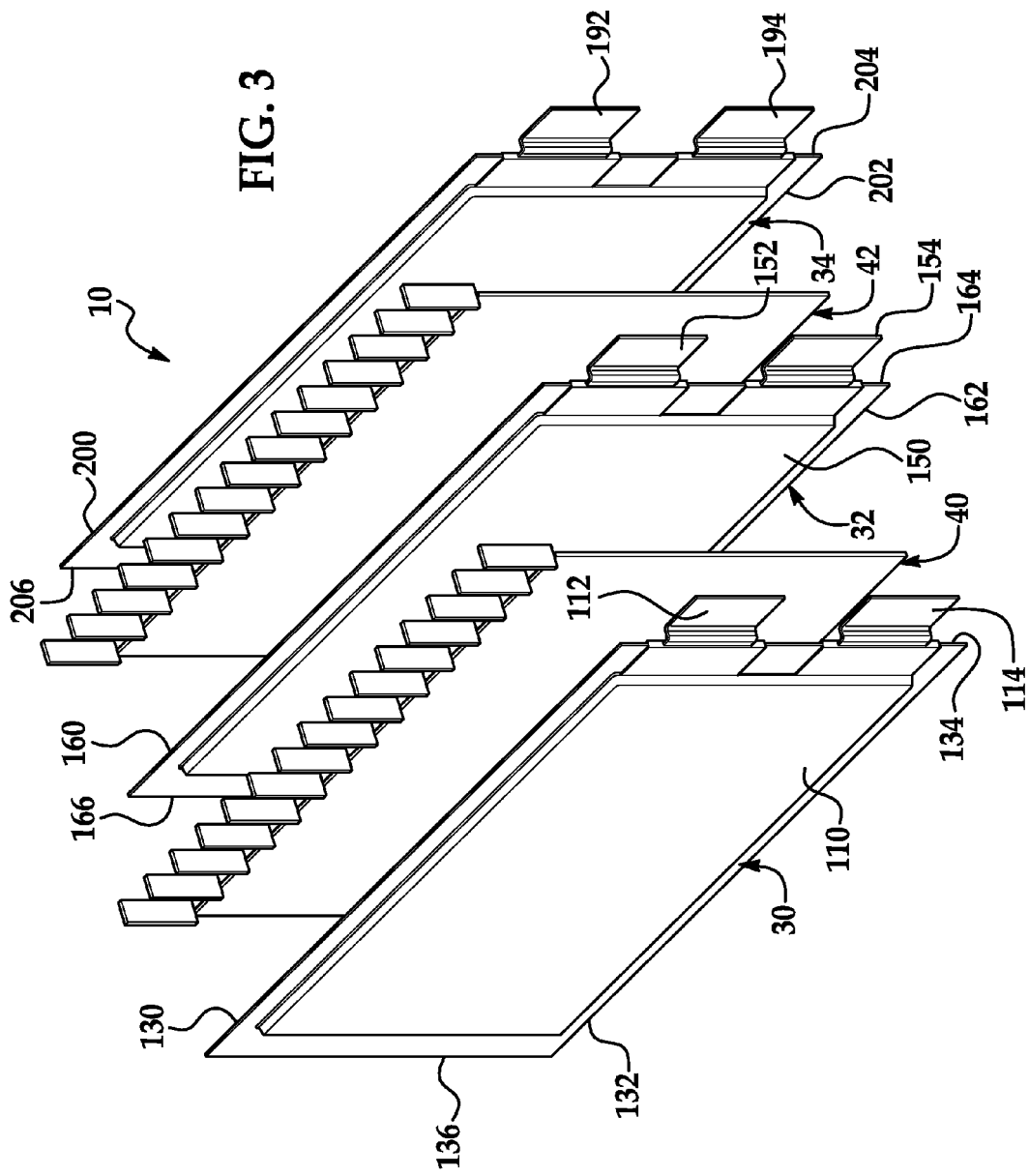
FIG. 3 is an exploded schematic of the first, second, third battery cells and the first and second cooling fins of FIG. 2.

Referring to FIGS. 1, 3 and 4, the battery cell 30 has a substantially rectangular-shaped body 110 and electrical terminals 112, 114. The substantially rectangular-shaped body 110 includes a first major surface 116 and a second major surface 118. The second major surface 118 is disposed opposite to and parallel to the first major surface 116. The substantially rectangular-shaped body 110 further includes a top edge 130, a bottom edge 132, and side edges 134, 136. The top edge 130 and the bottom edge 132 extend substantially parallel to one another, and perpendicular to the top edge 130 and the bottom edge 132. Further, the side edges 134, 136 extend substantially parallel to one another. The electrical terminals 112, 114 extend outwardly from the side edge 134 of the substantially rectangular-shaped body 110 in a direction parallel to the first flow path 94. In an exemplary embodiment, the battery cell 30 is a lithium-ion pouch-type battery cell, and the substantially rectangular-shaped body 110 is a substantially rectangular-shaped pouch-type body.

The battery cell 32 has a substantially rectangular-shaped body 150 and electrical terminals 152, 154. The substantially rectangular-shaped body 150 includes a first major surface 156 and a second major surface 158. The second major surface 158 is disposed opposite to and parallel to the first major surface 156. The substantially rectangular-shaped body 150 further includes a top edge 160, a bottom edge 162, and side edges 164, 166. The top edge 160 and the bottom edge 162 extend substantially parallel to one another. Further, the side edges 164, 166 extend substantially parallel to one another, and perpendicular to the top edge 160 and the bottom edge 162. The electrical terminals 152, 154 extend outwardly from the side edge 164 of the substantially rectangular-shaped body 150 in a direction parallel to the first flow path 94. In an exemplary embodiment, the battery cell 32 is a lithium-ion pouch-type battery cell, and the substantially rectangular-shaped body 150 is a substantially rectangular-shaped pouch-type body.

The battery cell 34 has a substantially rectangular-shaped body 190 and electrical terminals 192, 194. The substantially rectangular-shaped body 190 includes a first major surface 196 and a second major surface 198. The second major surface 198 is disposed opposite to and parallel to the first major surface 196. The substantially rectangular-shaped body 190 further includes a top edge 200, a bottom edge 202, and side edges 204, 206. The top edge 200 and the bottom edge 202 extend substantially parallel to one another. Further, the side edges 204, 206 extend substantially parallel to one another, and perpendicular to the top edge 200 and the bottom edge 202. The electrical terminals 192, 194 extend outwardly from the side edge 204 of the substantially rectangular-shaped body 190 in a direction parallel to the first flow path 94. In an exemplary embodiment, the battery cell 34 is a lithium-ion pouch-type battery cell, and the substantially rectangular-shaped body 190 is a substantially rectangular-shaped pouch-type body.

Figure 5:
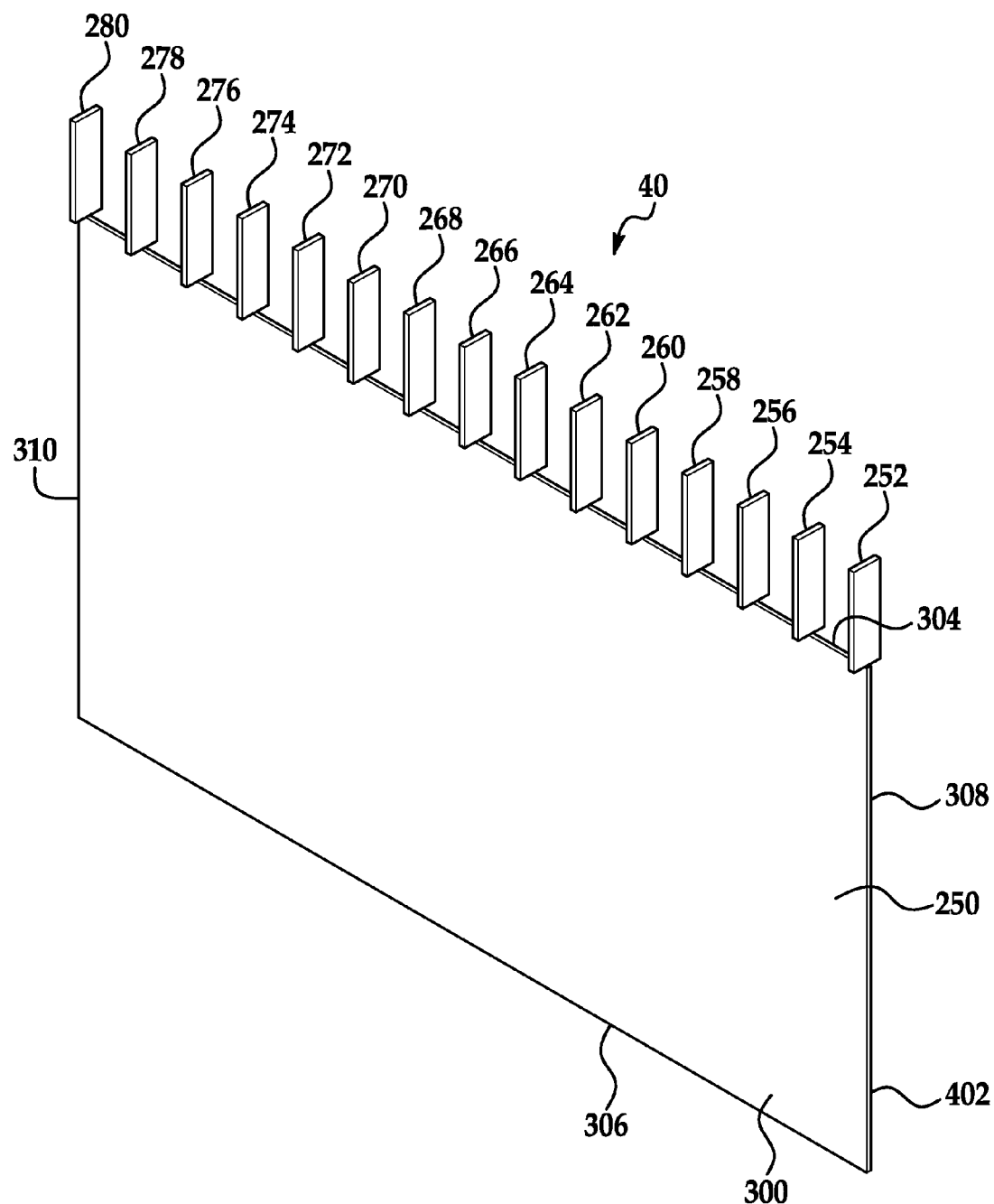
FIG. 5 is a schematic of the first cooling fin shown in FIG. 2.
Figure 6:
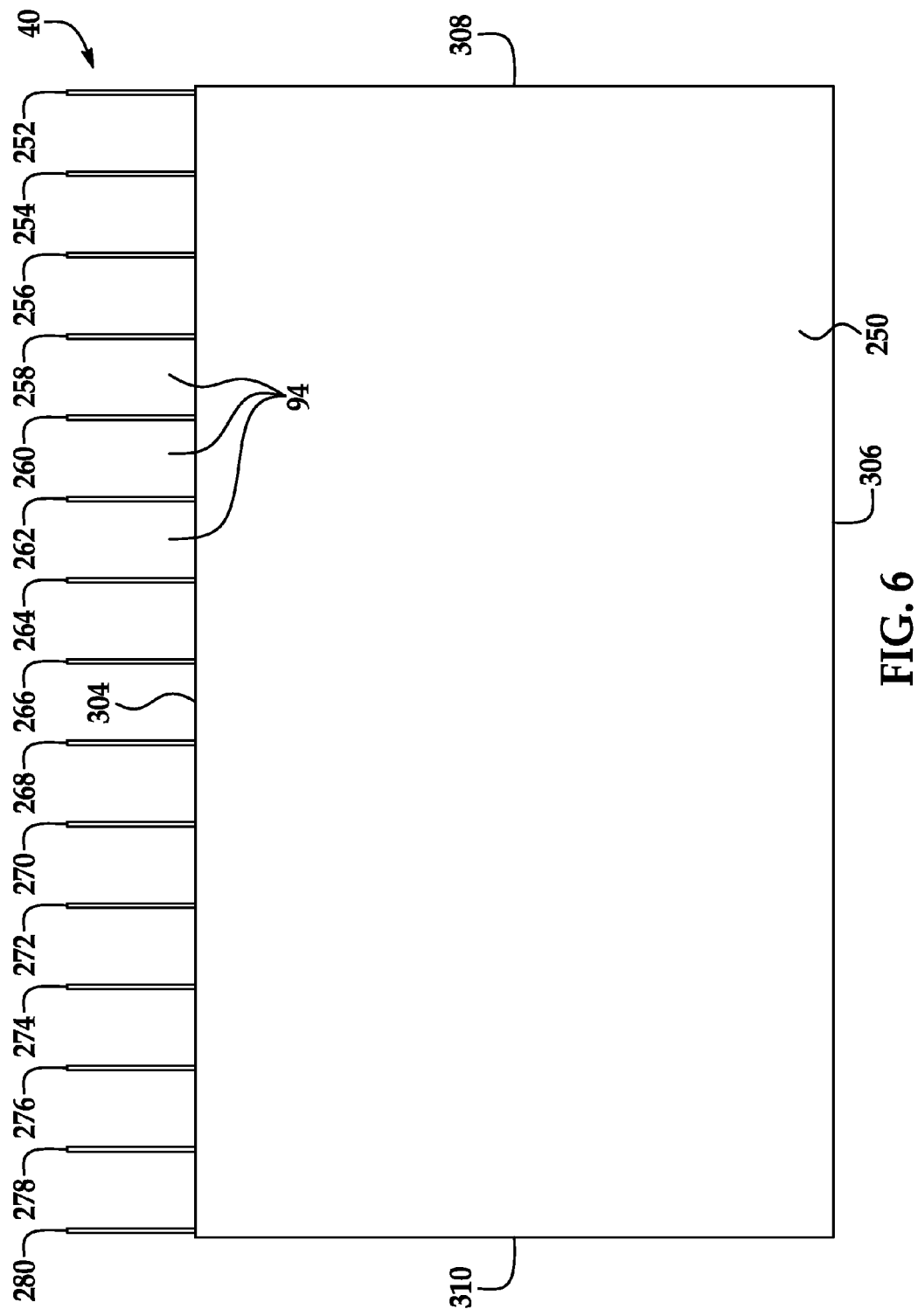
FIG. 6 is a side view of the first cooling fin of FIG. 5.

Referring to FIGS. 4-6, the cooling fin 40 has a substantially rectangular-shaped sheet 250 and tabs 252, 254, 256, 258, 260, 262, 264, 266, 268, 270, 272, 274, 276, 278, 280. The substantially rectangular-shaped sheet 250 has a first side 300 and a second side 302 disposed opposite to and parallel to the first side 300. Further, the substantially rectangular-shaped sheet 250 includes a top end 304, a bottom end 306, and side ends 308, 310. The tabs 252-280 are coupled to the top end 304 of the substantially rectangular-shaped sheet 250 and extend in a first direction from the substantially rectangular-shaped sheet 250. Further, the tabs 252-280 are disposed substantially perpendicular to the substantially rectangular-shaped sheet 250. In addition, the tabs 252-280 are disposed substantially perpendicular to the first and second major surfaces 116, 118 of the battery cell 30, and substantially perpendicular to the first and second major surfaces 156, 158 of the battery cell 32, and substantially perpendicular to the first and second major surfaces 196, 198 of the battery cell 34. The first side 300 of the substantially rectangular-shaped sheet 250 is disposed directly against and contacts the second major surface 118 of the substantially rectangular-shaped body 110 of the battery cell 30. The second side 302 of the substantially rectangular-shaped sheet 250 is disposed directly against and contacts the first major surface 156 of the substantially rectangular-shaped body 150 of the battery cell 32. In an exemplary embodiment, the substantially rectangular-shaped sheet 250 and the tabs 252-280 are integrally formed together from a single sheet of thermally conductive metal, and the tabs 252-280 are bent in a perpendicular direction relative to the substantially rectangular-shaped sheet 250. In an exemplary embodiment, the cooling fin 40 is constructed of aluminum. Of course, in an alternative embodiment, the cooling fin 40 could be constructed of other metals or thermally conductive plastics. During operation of the battery pack 10, the substantially rectangular-shaped sheet 250 conducts heat energy from the battery cells 30, 32 to the tabs 252-280, and the tabs 252-280 transfer the heat energy to air flowing past and contacting the tabs 252-280 in the first flow path 94 for cooling the battery cells 30, 32.

Figure 7:
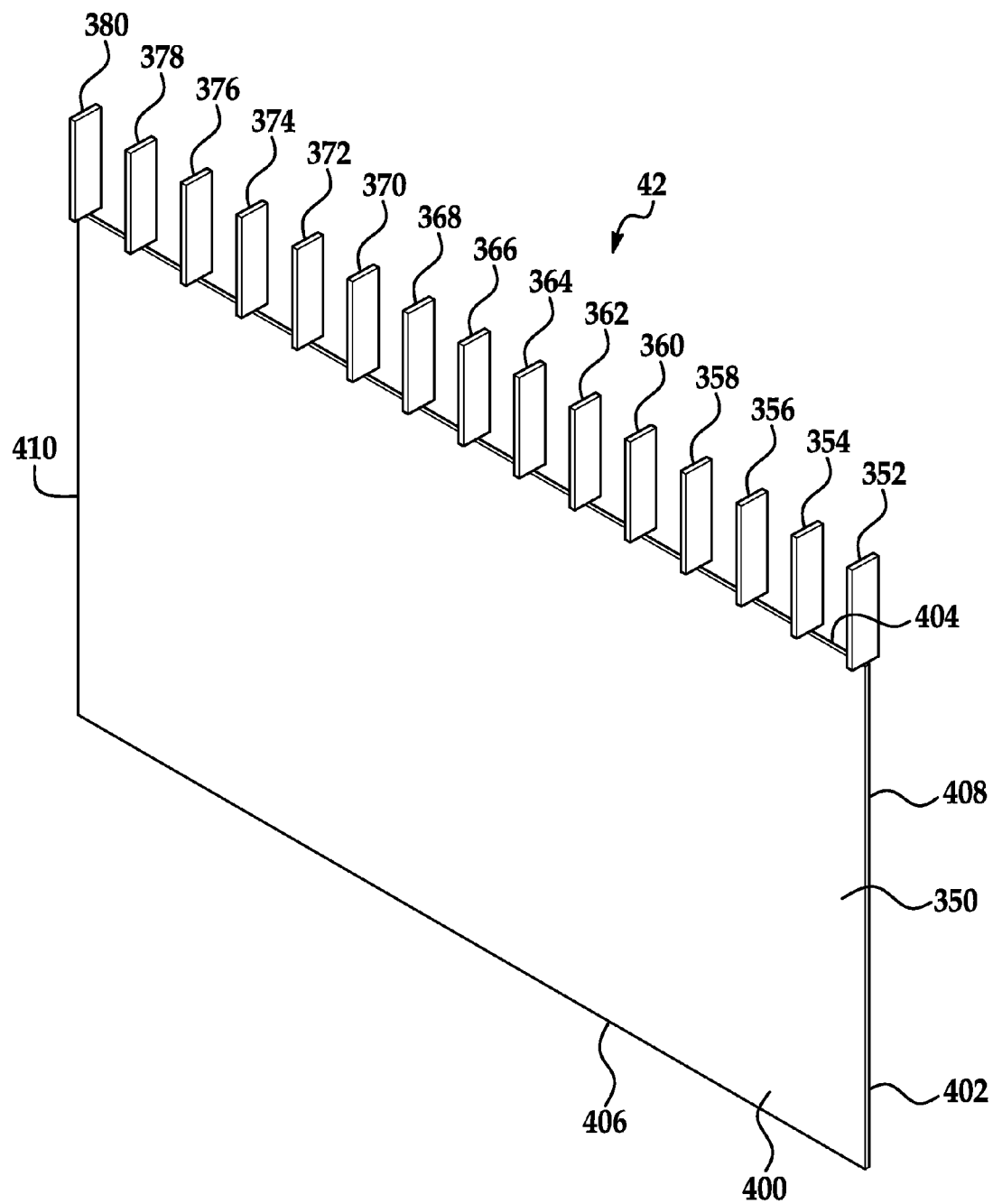
FIG. 7 is a schematic of the second cooling fin shown in FIG. 2.
Figure 8:
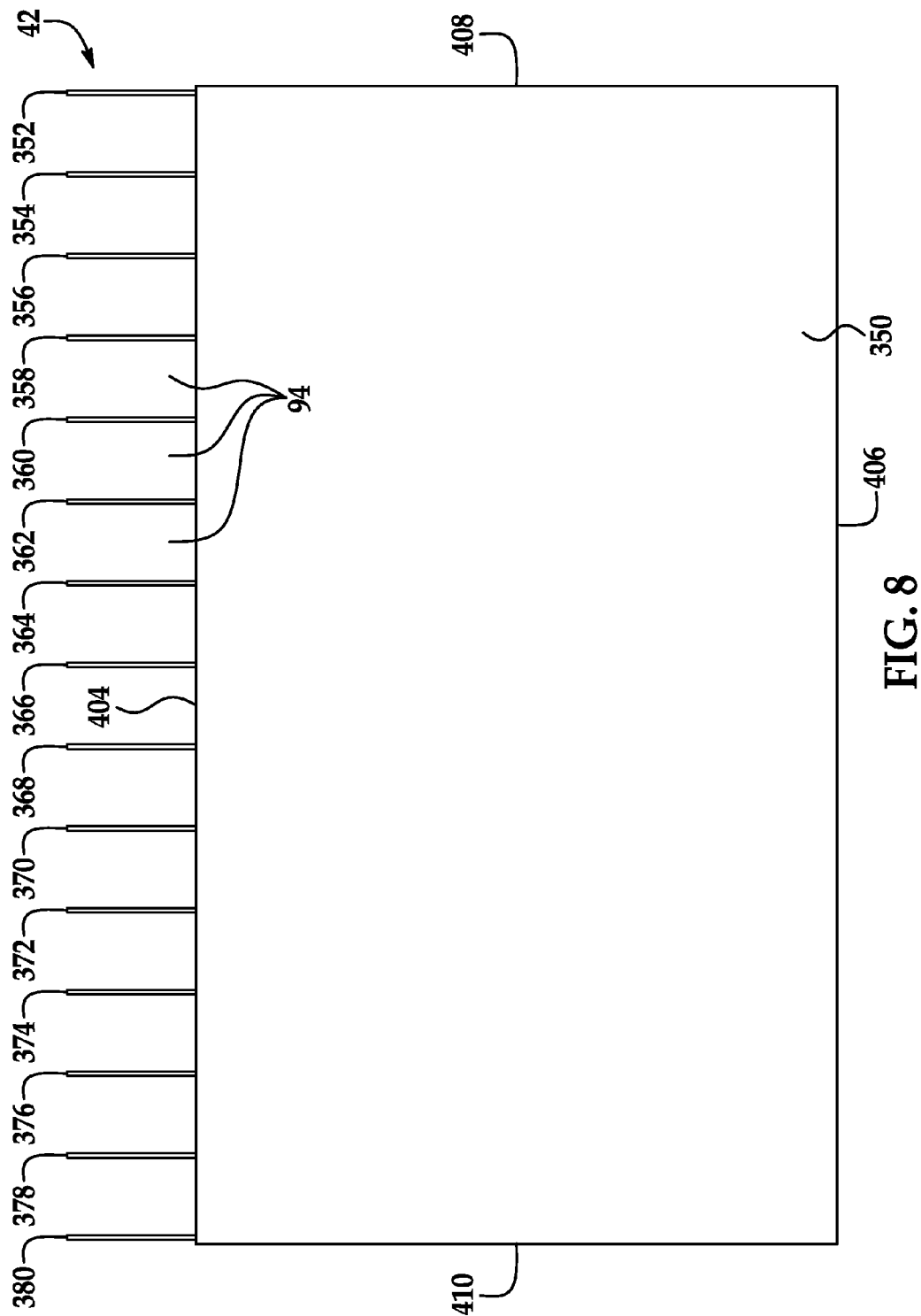
FIG. 8 is a side view of the second cooling fin of FIG. 7.

Referring to FIGS. 4, 7 and 8, the cooling fin 42 has a substantially rectangular-shaped sheet 350 and tabs 352, 354, 356, 358, 360, 362, 364, 366, 368, 370, 372, 374, 376, 378, 380. The substantially rectangular-shaped sheet 350 has a first side 400 and a second side 402 disposed opposite to and parallel to the first side 400. Further, the substantially rectangular-shaped sheet 350 includes a top end 404, a bottom end 406, and side ends 408, 410. The tabs 352-380 are coupled to the top end 404 of the substantially rectangular-shaped sheet 350 and extend in a first direction from the substantially rectangular-shaped sheet 350. Further, the tabs 352-380 are disposed substantially perpendicular to the substantially rectangular-shaped sheet 350. In addition, the tabs 352-380 are disposed substantially perpendicular to the first and second major surfaces 116, 118 of the battery cell 30, and substantially perpendicular to the first and second major surfaces 156, 158 of the battery cell 32, and substantially perpendicular to the first and second major surfaces 196, 198 of the battery cell 34. The first side 400 of the substantially rectangular-shaped sheet 350 is disposed directly against and contacts the second major surface 158 of the substantially rectangular-shaped body 150 of the battery cell 32. The second side 402 of the substantially rectangular-shaped sheet 350 is disposed directly against and contacts the first major surface 196 of the substantially rectangular-shaped body 190 of the battery cell 34. In an exemplary embodiment, the substantially rectangular-shaped sheet 350 and the tabs 352-380 are integrally formed together from a single sheet of thermally conductive metal, and the tabs 352-380 are bent in a perpendicular direction relative to the substantially rectangular-shaped sheet 350. In an exemplary embodiment, the cooling fin 42 is constructed of aluminum. Of course, in an alternative embodiment, the cooling fin 42 could be constructed of other metals or thermally conductive plastics. During operation of the battery pack 10, the substantially rectangular-shaped sheet 350 conducts heat energy from the battery cells 32, 34 to the tabs 352-380, and the tabs 352-380 transfer the heat energy to air flowing past and contacting the tabs 352-380 in the first flow path 94 for cooling the battery cells 32, 34.

Figure 2:
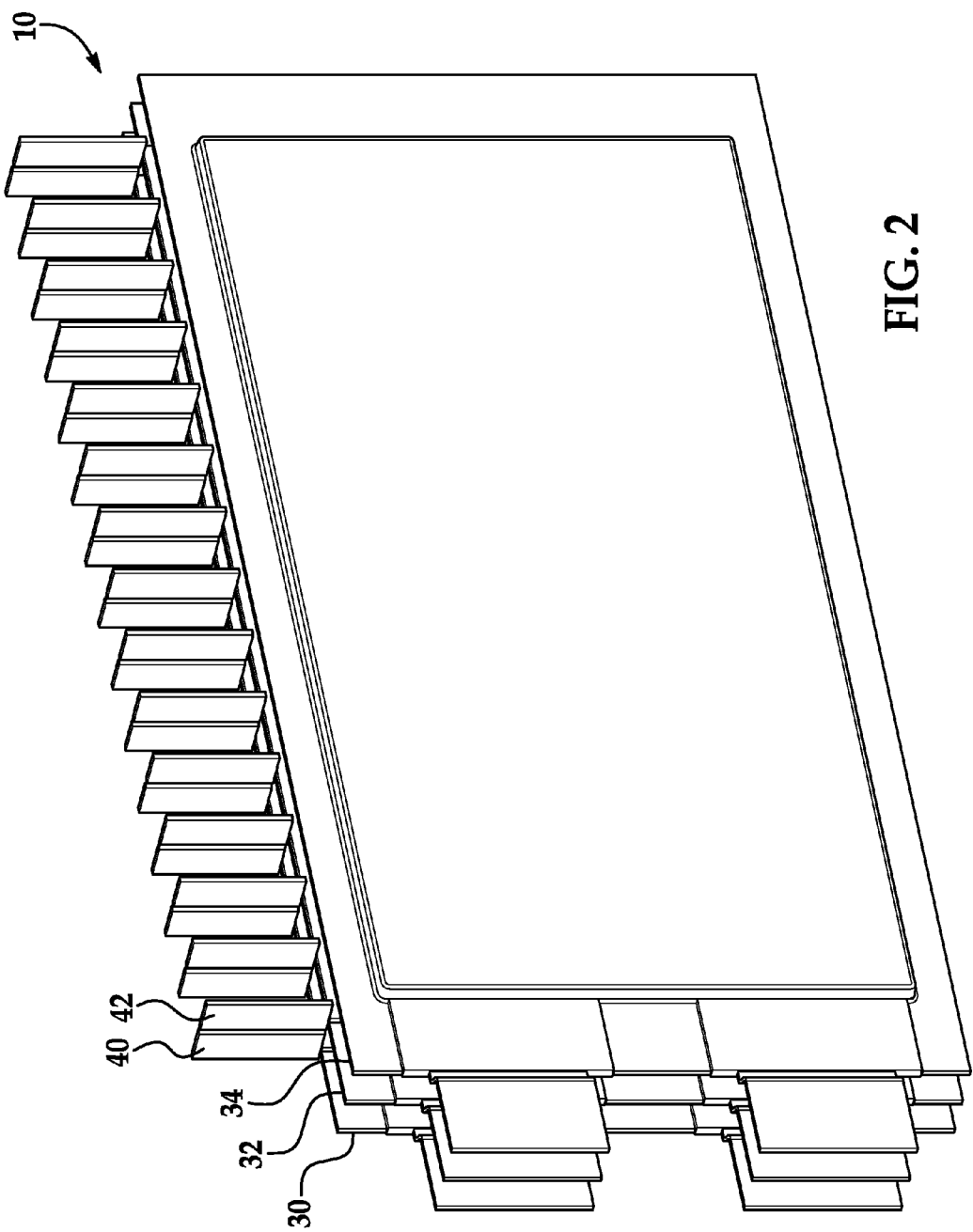
FIG. 2 is a schematic of first, second, third battery cells and first and second cooling fins utilized in the battery pack of FIG. 1.

Referring to FIGS. 2 and 4, when the cooling fins 40, 42 are disposed against the first major surface 156 and the second major surface 158, respectively, of the substantially rectangular-shaped body 150 of the battery cell 32 within the interior region 92 of the housing 20, the tabs 252-280 and the tabs 352-380, respectively, have a gap therebetween. For example, referring to FIG. 4, the tab 262 of the cooling fin 40 and the tab 362 of the cooling fin 42 have a gap 420 therebetween.

It is noted that the tabs 252-280 of the cooling fin 40 are disposed substantially co-planar with the tabs 352-380, respectively, of the cooling fin 42.

Referring to FIG. 4, the electric fan 50 is disposed within the interior region 92 of the housing 20. The electric fan 50 urges air to flow through the aperture 96 in the side wall 88, and then through the first flow path 94 to the side wall 86 where the air exits the aperture 98 in the side wall 86.

The battery pack described herein provides a substantial advantage over other battery packs. In particular, an advantage of the battery pack is that the battery pack utilizes cooling fins each having at least first, second, and third tabs disposed in a first flow path and being disposed substantially perpendicular to first and second major surfaces of each of the battery cells in the battery pack for conducting heat energy from the battery cells to air flowing through the first flow path. Further, the first and second major surfaces of each of the battery cells are disposed substantially perpendicular to the first flow path.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery pack, comprising:
a first battery cell having a substantially rectangular-shaped body with a first major surface and a second major surface;
a first cooling fin having a substantially rectangular-shaped sheet and at least first, second, and third flat rectangular-shaped tabs; the substantially rectangular-shaped sheet of the first cooling fin having a first side and a second side; the first, second, and third flat rectangular-shaped tabs of the first cooling fin being coupled to a top end of the substantially rectangular-shaped sheet of the first cooling fin and extending upwardly from the substantially rectangular-shaped sheet of the first cooling fin; the first, second, and third flat rectangular-shaped tabs of the first cooling fin being disposed and extending substantially perpendicular to the first and second sides of the substantially rectangular-shaped sheet of the first cooling fin and extending past both the first and second sides of the substantially rectangular-shaped sheet of the first cooling fin; the first, second, third flat rectangular-shaped tabs of the first cooling fin being further disposed substantially perpendicular to the first and second major surfaces of the first battery cell; the first side of the substantially rectangular-shaped sheet of the first cooling fin being disposed directly against and contacting the first major surface of the substantially rectangular-shaped body of the first battery cell; and
a housing defining an interior region therein, the first battery cell and the first cooling fin being disposed within the interior region, the housing having a first flow path within the interior region between a top edge of the first battery cell and a top wall of the housing, the first and second major surfaces of the first battery cell being disposed substantially perpendicular to the first flow path, such that air flowing through the first flow path contacts the first, second, and third flat rectangular-shaped tabs of the first cooling fin to conduct heat energy away from the first cooling fin to reduce a temperature level of the first battery cell.

2. The battery pack of claim 1, wherein a vertical height of each of the first, second, and third flat rectangular-shaped tabs of the first cooling fin is less than 30% of a vertical height of the substantially rectangular-shaped sheet of the first cooling fin.

3. The battery pack of claim 1, wherein the first, second, and third flat rectangular-shaped tabs of the first cooling fin are disposed substantially parallel to one another.

4. The battery pack of claim 1, further comprising:
a second battery cell having a substantially rectangular-shaped body with a first major surface and a second major surface; and
the first major surface of the second battery cell being disposed directly against and contacting the second side of the substantially rectangular-shaped sheet of the first cooling fin.

5. The battery pack of claim 4, further comprising:
a second cooling fin having a substantially rectangular-shaped sheet and at least first, second, and third flat rectangular-shaped tabs; the substantially rectangular-shaped sheet of the second cooling fin having a first side and a second side; the first, second, and third flat rectangular-shaped tabs of the second cooling fin being coupled to a top end of the substantially rectangular-shaped sheet of the second cooling fin and extending upwardly from the substantially rectangular-shaped sheet of the second cooling fin; the first, second, and third flat rectangular-shaped tabs of the second cooling fin being disposed substantially perpendicular to the first and second sides of the substantially rectangular-shaped sheet of the second cooling fin and extending past both the first and second sides of the substantially rectangular-shaped sheet of the second cooling fin; the first, second, and third flat rectangular-shaped tabs of the second cooling fin being further disposed substantially perpendicular to the first and second major surfaces of the second battery cell; the first side of the substantially rectangular-shaped sheet of the second cooling fin being disposed directly against and contacting the second major surface of the substantially rectangular-shaped body of the second battery cell;
a third battery cell having a substantially rectangular-shaped body with a first major surface and a second major surface; and
the first major surface of the third battery cell being disposed directly against and contacting the second side of the substantially rectangular-shaped sheet of the second cooling fin.

6. The battery pack of claim 5, wherein the first, second, and third flat rectangular-shaped tabs of the first cooling fin extend substantially planar with the first, second, and third flat rectangular-shaped tabs, respectively, of the second cooling fin.

7. The battery pack of claim 6, wherein the first flat rectangular-shaped tab of the first cooling fin and the first flat rectangular-shaped tab of the second cooling fin are disposed apart from one another such a gap is formed therebetween.

8. The battery pack of claim 1, wherein the first battery cell is a pouch-type lithium-ion battery cell and the substantially rectangular-shaped body thereof is a substantially rectangular-shaped pouch-type body.

9. The battery pack of claim 1, wherein the first battery cell further includes first and second electrical terminals extending outwardly from the substantially rectangular-shaped body thereof, the first and second electrical terminals extending in a direction parallel to the first flow path.

10. The battery pack of claim 1, wherein the first side of the substantially rectangular-shaped sheet of the first cooling fin contacts at least 90% of the first major surface of the first battery cell.

11. A battery pack, comprising:
a first battery cell having a substantially rectangular-shaped body with a first major surface and a second major surface;
a first cooling fin having a substantially rectangular-shaped sheet and at least first, second, and third rectangular-shaped tabs; the substantially rectangular-shaped sheet of the first cooling fin having a first side and a second side; the first, second, and third rectangular-shaped tabs of the first cooling fin being coupled to a top end of the substantially rectangular-shaped sheet of the first cooling fin and extending upwardly from the substantially rectangular-shaped sheet of the first cooling fin; the first, second, and third rectangular-shaped tabs of the first cooling fin being disposed and extending substantially perpendicular to the first and second sides of the substantially rectangular-shaped sheet of the first cooling fin and extending past both the first and second sides of the substantially rectangular-shaped sheet of the first cooling fin; the first, second, and third rectangular-shaped tabs of the first cooling fin being further disposed substantially perpendicular to the first and second major surfaces of the first battery cell; the first side of the substantially rectangular-shaped sheet of the first cooling fin being disposed directly against and contacting the first major surface of the substantially rectangular-shaped body of the first battery cell; and a housing defining an interior region therein, the first battery cell and the first cooling fin being disposed within the interior region, the housing having a first flow path within the interior region between a top edge of the first battery cell and a top wall of the housing, the first and second major surface of the first battery cell being disposed substantially perpendicular to the first flow path, such that air flowing through the first flow path contacts the first, second, and third rectangular-shaped tabs of the first cooling fin to conduct heat energy away from the first cooling fin to reduce a temperature level of the first battery cell.

12. The battery pack of claim 11, wherein the first, second, and third rectangular-shaped tabs of the first cooling fin are disposed substantially parallel to one another.

* * * * *